United States Patent
Kerres et al.

(10) Patent No.: US 6,194,474 B1
(45) Date of Patent: *Feb. 27, 2001

(54) ACID-BASE POLYMER BLENDS AND THEIR APPLICATION IN MEMBRANE PROCESSES

(75) Inventors: Jochen Kerres; Wei Cui, both of Stuttgart (DE)

(73) Assignee: Universtitat Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/096,189

(22) Filed: Jun. 12, 1998

(51) Int. Cl.$^7$ .................................................. C08J 5/22

(52) U.S. Cl. ........................ 521/27; 525/390; 525/418; 525/471; 525/480

(58) Field of Search ............................... 521/27; 525/471

(56) References Cited

U.S. PATENT DOCUMENTS

| | | | |
|---|---|---|---|
| 4,755,540 | * | 7/1988 | Blakey .................................. 521/62 |
| 5,438,082 | * | 8/1995 | Helmer-Metzmann .............. 522/149 |
| 5,561,202 | * | 10/1996 | Helmer-Metzmann .............. 525/471 |
| 5,741,408 | * | 4/1998 | Helmer-Metzmann .............. 204/252 |

FOREIGN PATENT DOCUMENTS

| | | |
|---|---|---|
| 4026154 | 8/1990 | (DE) . |
| 0574791 | 6/1993 | (EP) . |
| 16002 | 7/1994 | (WO) . |
| WO9508581 | 3/1995 | (WO) . |

OTHER PUBLICATIONS

W. Cui et al., "Development and Characterization of Ion–Exchange Polymer Blend Membranes" Abstract, Euromembrane Sep. 1997, p. 181.

J. Kerres et al., "Entwick von Membrane fur die Eletrolyse und fur Membranbrennstoffzellen" Kolloquium 1997 des SFB 270 pp. 169–193 (in German; no translation is available to Applicants).

W. Grot, "Perfluoroinated Ion Exchange Polymers and Their Use in Research and Industry" Macromol. Symp., 1994, vol. 82, pp. 161–172.

K. Ledjeff et al., "Die reversible Membran—Brennstoffzelle" Dechema–Monograph, 1993, vol. 128, pp. 103–115.

S. Surampudi et al., "Advances in Direct Oxidation Methanol Fuel Cells" Power Sources, 1994, vol. 47, pp. 377–385.

G. Scherer, "Polymer Membranes for Fuel Cells" Ber. Bunsenges. Phys. Chem., 1990, vol. 94, pp. 1008–1014.

F.N. Büet al., "Radiation Grafted and Sulfonated (FEP–g–Polystyrene)—An Alternative to Perflourinated Membranes for PEM Fuel Cells?" SAE Technical Paper Series, Intersociety Energy Conversion Engineering Conference, Aug. 3–7, 1992, pp. 3.419–3.424.

B. Gupta et al., "Materials Research Aspects of Organic Solid Proton Conductors" Solid State Ionics, 1993, vol. 61, pp. 213–218.

D. Livingston et al., "Poly–$\alpha$,62 ,$\beta$–trifluorostyrene" Journal of Polymer Science, 1956, vol. XX, pp. 485–490.

J.S. Wainright et al., "Acid Doped Polybenzimidazoles, A New Polymer Electroyte" J. Electrochem. Soc., 1995, vol. 7, pp. L121–L123.

R. Nolte et al., "Partially sulfonated poly(arlene ether sulfone)—A versatile proton conducting membrane material for modern energy conversion technologies" Journal of Membrane Science, 1993, vol. 83, pp. 211–220.

K. Miyatake et al., "Synthesis of Poly(phenylene sulfide sulfonic acid) via Poly(sulfonium cation) as a Thermostable Proton–Conducting Polymer" Macromolecules, 1996, vol. 29, pp. 696–6971.

C.G. Bazuin, "Ionomers (Compatibilization of Blends)" Polymeric Materials Encyclopedia, vol. 5, ed. J. Salamone, 1996, pp. 3454–3460.

X. Zhang and A. Eisenberg, "NMR and Dynamic Mechanical Studies of Miscibility Enhancement via Ionic Interactions in Polystyrene/poly(ethyl Acrylate) Blends" Journal of Polymer Science:Part B: Polymer Physics, 1990, vol. 28, pp. 1841–1857.

J. Kerres et al., "New Sulfonated Engineering Polymers via the Metalation Route. I. Sulfonated Poly(ethersulfone) PSU Udel via Metalation–Sulfination–Oxide" Journal of Polymer Science: Part A:Polymer Chemistry, 1996, vol. 34, pp. 2421–2438.

M. Guiver et al., "Chemical Modification of Polysulfones II: And Efficient Method for Introducing Primary Amine Groups onto the Aromatic Chain" Macomolecules, 1995, vol. 28, pp. 7612–7621.

A.J. Van Zyl et al. "Perfluorosulfonate Ionomer Membranes for Separation of Petrochemical Mixtures" Journal of Materials Science, 1996, vol. 15, pp. 1454–1456.

* cited by examiner

Primary Examiner—Fred Zitomer
(74) Attorney, Agent, or Firm—Baker Botts LLP

(57) ABSTRACT

The present invention provides a process for the preparation of ion-exchange membranes for use in electromembrane processes. The membranes are prepared from a solution, in a dipolar-aprotic solvent, containing (a) a polymeric sulfonic acid or a polymeric sulfonate salt of formula Polymer-SO$_3$X, where X is H or a monovalent cation, and (b) a basic polymer containing primary, secondary or tertiary basic N. The dissolved polymer blend is spread in a thin layer onto a support, and the solvent is evaporated to form a polymeric film. The films produced by the process are particularly useful as ion-exchange membranes due to improved properties relative to the component polymers with regard to ionic conductivity, swelling permselectivity, and thermal resistance.

8 Claims, 3 Drawing Sheets

ACID-BASE POLYMER BLENDS AND THEIR APPLICATION IN MEMBRANE PROCESSES

Figure 1:
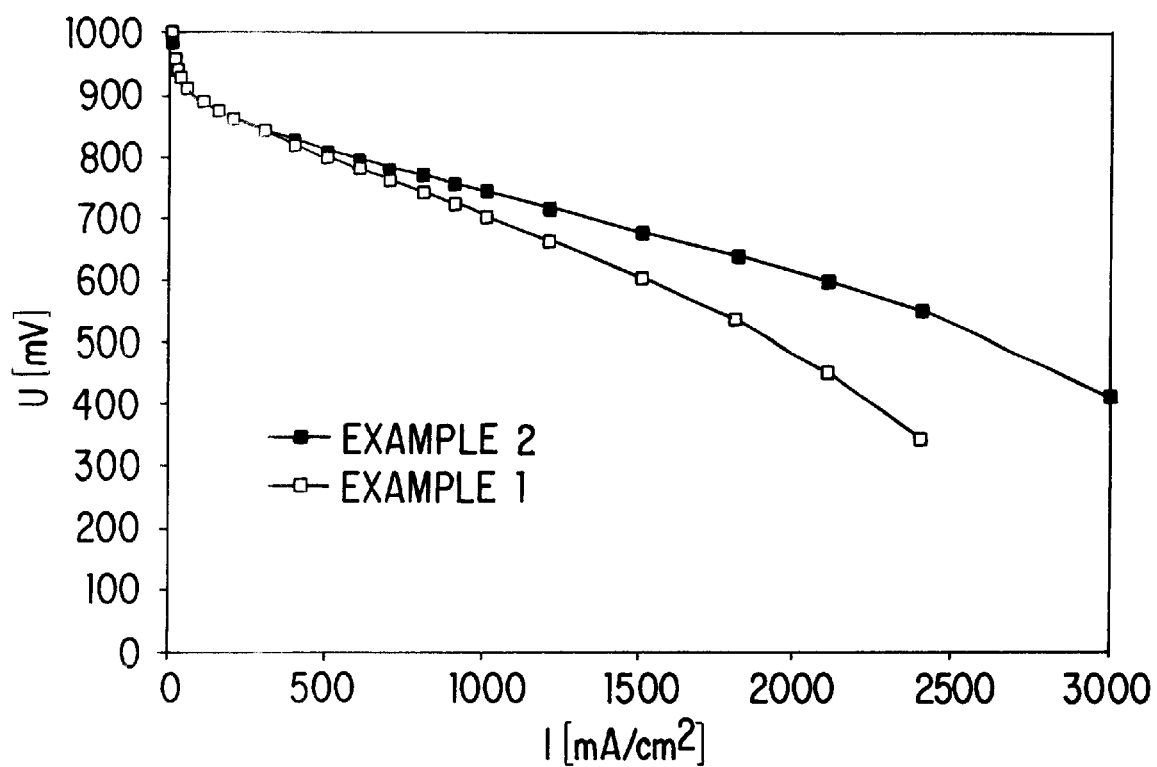

This invention is directed to polymer blends and polymer blend membranes which consist of a polymeric sulfonic acid and of a polymer which contains primary, secondary or tertiary amino groups, which are prepared via mixing of a polymeric sulfonic acid or a polymeric sulfonic acid salt with a polymer which contains primary, secondary or tertiary amino groups.

A further object of this invention is the application of these polymer blend membranes in membrane fuel cells, i.e., direct methanol fuel cells (DMFC) or $H_2$— polymer electrolyte fuel cells (PEFC), in membrane electrolysis, in aqueous or non-aqueous electrodialysis, in diffusion dialysis, in the perstractive separation of alkenes from alkene/alkane mixtures (here the membranes are in the $SO_3Ag$ form, where the $Ag^+$ forms a reversible complex with the alkene double bond (–> facilitated transport)), in the pervaporative separation of water from water/organics mixtures, or in gas separation.

A key-component of the PEFC is the proton-conducting membrane. The commercially available ionomer NAFION® (Grot, W. G.: Perfluorinated Ion-Exchange Polymers and Their Use in Research and Industry, Macromolecular Symposia, 82, 161–172 (1994)) fulfils the requirements of chemical stability for the application in PEFC (Ledjeff, K.; Heinzel, A.; Mahlendorf, F.; Peinecke, V.: Die reversible Membran-Brennstoffzelle, Dechema-Monographien Band 128, VCH Verlagsgesellschaft, 103–118 (1993)). However, it shows some disadvantages requiring the search for alternative materials. It is very expensive (US$ 800/m²). The very complex production process involves highly toxic intermediates (see Grot, W. G.). Its environment-compatibility is poor: as a perfluorinated polymer, it is difficultly degradable, and the recyclability of NAFION® is questionable. When applying NAFION® in DMFC, it was discovered that it shows (especially when applying pure methanol) a very high methanol-permeability (Surampudi, S., Narayanan, S. R.; Vamos, E.; Frank, H.; Halpert, G.; LaConti, A.; Kosek, J.; Surya Prakash, G. K.; Olah, G. A.: Advances in direct oxidation methanol fuel cells J. Power Sources, 47, 377–385 (1994)) which reduces the energy-efficiency of the DMFC via mix-potential formation.

Partially fluorinated membranes are under investigation at present. At this point, the scientific work of G. G. Scherer et al can be mentioned (Scherer, G. G.: Polymer Membranes for Fuel Cells, Ber. Bunsenges. Phys. Chem. 94, 1008–1014 (1990)); (Scherer, G. G.; Büchi, F. N.; Gupta, B.; Rouilly, M.; Hauser, P. C; Chapiro, A.: Radiation Grafted and Sulfonated (FEP-g-Polystyrene)—An Alternative to Perfluorinated Membranes for PEM Fuel Cells? Proceedings of the 27th Intersociety Energy Conversion Engineering Conference IECEC-92, San Diego, USA, Aug. 3–7, 3.419–3.424 (1992)); (Gupta, B.; Büchi, F. N; Scherer, G. G: Materials Research Aspects of Organic Solid Proton Conductors, Solid State Ionics 61, 213–218 (1993)). Scherer et al. has formed radicals in perfluorinated polymer foils (FEP) by gamma-irradiation. In a second step, styrene was grafted onto the formed radicals. In a third step, polystyrene chains of the interpenetrating network (IPN) formed were sulfonated. These polymer membranes showed a good performance in the PEFC application. However, the applied synthesis process seems to be unsuitable for mass production. The Canadian company Ballard has developed a partially fluorinated proton-conducting membrane from alpha,beta,beta-trifluorostyrene (Wei, J.; Stone, C.; Steck, A. E.: Trifluorostyrene and substituted trifluorostyrene copolymeric compositions and ion-exchange membranes formed therefrom, WO 95/08581, Ballard Power Systems). A disadvantage of this membrane is its high price because of the complex synthesis process for the monomer alpha,beta,beta-trifluorostyrene (Livingston, D. I.; Kamath, P. M.; Corley, R. S.: Poly-alpha,beta,beta-trifluorostyrene, Journal of Polymer Science, 20, 485–490 (1956)) and because of the bad sulfonation-ability of poly(alpha,beta,beta-trifluorostyrene).

Some references are found in the literature to the application of arylene main-chain polymers to PEFC. The most important articles will be mentioned in the following:

Polybenzimidazole—phosphoric acid

Membranes of the engineering-thermoplast polybenzimidazole are soaked with phosphoric acid (Wainright, J. S.; Wang, J.-T.; Savinell, R. F.; Litt, M.; Moaddel, H.; Rogers, C.: Acid Doped Polybenzimidazoles, A New Polymer Electrolyte The Electrochemical Society, Spring Meeting, San Francisco, May 22–27, Extended Abstracts, Vol. 94-1, 982–983 (1994)), and the phosphoric acid works as a proton conductor. The $H_3PO_4$-molecules are held in the membrane via hydrogen bridges and via protonation of the basic imidazole-N by formation of the salt $H_2PO_4^-$ $^+HN$Polymer. However, these membranes can lose a part of the $H_3PO_4$-molecules when water is formed during the fuel cell reaction, because the relation of $H_3PO_4$-molecules to imidazole-N's is roughly 3:1—the $H_3PO_4$ is dragged out of the membrane by the reaction water.

Sulfonated Polyethersulfone

Ledjeff et al. (Nolte, R.; Ledjeff, K.; Bauer, M.; Mülhaupt, R.: Partially Sulfonated poly(arylene ether sulfone)—A Versatile Proton Conducting Membrane Material for Modern Energy Conversion Technologies, Journal of Membrane Science 83, 211–220 (1993)) suggest the application of crosslinked sulfonated polyethersulfone ionomers, prepared via electrophilic sulfonation of polyethersulfone, in PEFC. However, in this paper no U/i curve of the presented membrane is provided, precluding an evaluation of the suitability of this ionomer for the PEFC application.

Sulfonated polyetheretherketone (PEEK)

The application of sulfonated polyetherketones in PEFC is presented by Helmer-Metzmann, F., Ledjeff, K.; Nolte, R., et al.: Polymerelektrolyt-Membran und Verfahren zu ihrer Herstellung, EP 0 574 791 A2. Good performance of these polymers in PEFC is claimed. However, these membranes show high swelling values at the high proton conductivities required for a good performance in PEFC, which results in poor mechanical stability and thus limited lifetime in fuel cells. In addition, especially when PEEK is sulfonated heterogeneously, there is the risk that the polymer partially recrystallizes which leads to brittleness.

Sulfonated Polyphenylene

Membranes prepared from organics-soluble, chemically and thermally stable poly(phenylene)s are suggested as alternative proton-conductors for the application in PEFC (Matejcek, L.; Nolte, R.; Heinzel, A.; Ledjeff, K.; Zerfass, T.; Mülhaupt, R.; Frey, H.: Die Membranbrennstoffzelle: Untersuchungen an Membran/Elektrodeneinheiten, Jahrestagung 1995 der Fachgruppe Angewandte Elektrochemie der GDCh, Duisburg, 27.–29. Sept. 1995, Abstract Poster Nr. 20 (1995)). However, no investigations of these membranes in PEFC have been published.

Sulfonated Polyphenylenesulfide

The development of a chemically and thermally stable polyphenylenesulfide via polysulfoniumcation-intermediate is reported in Miyatake, K.; Iyotani, H.; Yamamoto, K.; Tsuchida, E.: Synthesis of Poly(phenylene sulfide sulfonic acid) via Poly(sulfonium cation) as a Thermostable Proton-Conducting Polymer Macromolecules 1996, 29, 6969–6971 (1996). The disadvantage of this preparation process is, however, that it is relatively complicated and thus expensive.

Acid-base polymer blends based on vinyl polymers are often mentioned in the respective literature (Bazuin, C. G.: Ionomers (Compatibilization of Blends), in: Polymeric Materials Encyclopedia (Ed.-in-Chief J. C. Salomone), Vol. 5 (H-L), CRC Press (Boca Raton, New York, London, Tokyo) 3454–3460 (1996)) including, for example, such acid-base blends containing polymethacrylates as acidic component and polyvinylpyridinium salts as basic component (Zhang, X.; Eisenberg, A.: NMR and Dynamic Mechanical Studies of Miscibility Enhancement via Ionic Interactions in Polystyrene/poly(ethyl Acrylate) Blends, J. Polym. Sci.: Part B: Polymer Physics, 28, 1841–1857 (1990)). These blends have been investigated in terms of compatibility of the blend components. However, practical applications of these blends have not been published so far.

As aforementioned, the development of chemically stable ionomer membranes for electro-membrane processes, especially for membrane fuel cells, is a very important area of research. The ionomer membranes should be selected out of the group of arylene main-chain polymers, because these polymers show the best chemical stability, next to the (per)fluorinated polymers.

All sulfonated aryl-polymers show a high level of brittleness when drying-out, for example when they are applied in fuel cells at intermittent conditions. The reduction of the brittleness of the sulfonated arylene main-chain polymers thus is important to their further development for the long-term application in PEFC.

The aforementioned need is solved via a process for the preparation of ion-exchange membranes, comprising the steps of mixing of solutions of polymeric sulfonic acids or sulfonic acid salts having the general formula Polymer-SO$_3$X, where X=H, single valence metal (for example: Li, Na, K, Cs, Ag), NH$_4$, NH$_3$R, NH$_2$R$_2$, NHR$_3$, NR$_4$, PyridinH, R=any alkyl- and/or aryl radical with polymers containing primary, secondary, or tertiary nitrogen in dipolar-aprotic solvents, and posttreating the obtained sulfonic acid or sulfonic acid salt blends in hot, diluted mineralic acid at a temperature in the range of 20 to 100° C. Typically, the dissolved polymer blend is cast on a support to form a film upon removal of the solvent. After the solvent is removed (and preferably after removing the film from the support), the film is treated with dilute mineral acid (such as HCl or H$_2$SO$_4$); excess acid may be washed out with, e.g., deionized water. Optionally, the polymeric sulfonic acid may be neutralized by addition of an amount of low-molecular weight primary, secondary, or tertiary amines equivalent to the amount of SO$_3$H groups before addition of the basic polymer to the dipolar-aprotic solvent. Suitable dipolar aprotic solvents include N-methylpyrrolidinone, N,N-dimethylacetamide, N,N-dimethylformamide, sulfolane and dimethyl sulfoxide.

In the polymer blend membranes of the invention at least the polymeric sulfonic acid consists of an arylene main-chain polymer (for example polyethersulfone, polyetherketone, polyphenylene oxide), and thus a high mechanical, chemical and thermal stability of the blends is obtained, which makes the acid-base blends of the invention a very reasonable alternative to the perfluorinated ionomer membranes in the PEFC or DMFC application.

Acid-base blends on the basis of PEEK have been described by the inventors, i.e. Kerres, J.; Cui, W.; Wagner, N.; Schnurnberger, W.; Eigenberger, G.; A.7 Entwicklung von Membranen für die Elektrolyse und für Membranbrennstoff-Zellen Vortrag, "Jahreskolloquium 1997 des Sonderforschungsbereichs 270—Energieträger Wasserstoff", Sep. 29, 1997, Berichtsband p 169–193 (1997) ISBN: 3-00-001769-8; and Cui, W.; Kerres, J.; Eigenberger, G.; Development and Characterization of Ion-Exchange Polymer Blend Membranes Poster, Euromembrane '97 "Progress in Membrane Science and Technology," University of Twente, Jun. 23–27, 1997, Abstracts p 181 (1997). Here, the polymer blends are produced by mixing poly (etheretherketone sulfonic acid) and poly(ethersulfone ortho sulfone diamine) (PSH-NH$_2$) in a dipolar-aprotic solvent and subsequently evaporating the solvent. In the publications, the characterization of said special polymer blends with regard to ionic conductivity, swelling, permselectivity, and thermal resistance as well as the application of one of said membranes exclusively in electrodialysis is described. With the specified process (mixing the polymeric sulfonic acid and the polymeric amine) only acid-base blends having a very weak basic amino component can be produced, as is the case with poly(ethersulfone ortho sulfone diamine). Stronger polymeric bases form an insoluble polyelectrolyte complex immediately after mixing with the polymeric sulfonic acid.

It was established that when mixing a polymeric sulfonic acid/sulfonic acid salt, for example poly(ethersulfone sulfonic acid)/poly(ethersulfone sulfonic acid salt), or poly (etheretherketone sulfonic acid)/poly(etheretherketone sulfonic acid salt) of the general formula I

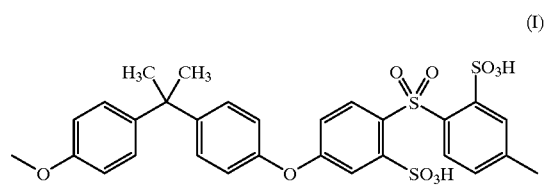

(I)

poly(ethersulfone sulfonic acid (salt)) PSU Udel® with 2 sulfonic acid (sulfonic acid salt) groups per repeating unit; obtainable as described in Kerres, J.; Cui, W.; Reichle, S.: New sulfonated engineering polymers via the metalation route. I. Sulfonated poly(ethersulfone) (PSU Udel®) via metalation-sulfination-oxidation, Journal of Polymer Science, Part A: Polymer Chemistry 34, 2421–2438 (1996)) or poly(etheretherketone sulfonic acid (salt)) of the general formula II

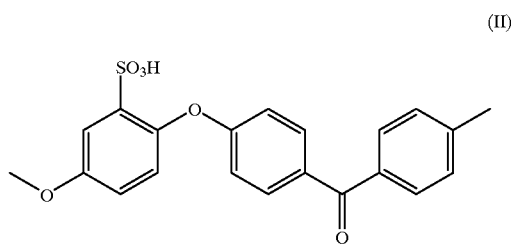

(II)

poly(etherketone sulfonic acid (salt)) with 1 sulfonic acid group per repeating unit prepared via Helmer-Metzmann et al. with poly(ethersulfone-ortho-sulfone-diamine) of the general formula III

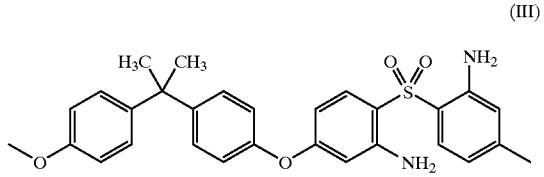

(III)

poly(ethersulfone-ortho-sulfone-diamine) with 2 primary amino groups per repeating unit, prepared as described in Guiver, M. D.; Robertson, G. P.; Foley, S.: Chemical Modification of Polysulfones II: An Efficient Method for Introducing Primary Amine groups onto the aromatic chain, Macromolecules 28, 7612–7621 (1995) a polymer blend is obtained which surprisingly shows following properties:

(1) strong reduction of the brittleness, compared to the pure polymeric sulfonic acid;

(2) water-soluble sulfonic acids surprisingly lose their water-solubility after the mixing with the polymeric basic N-containing compound because of the interactions of the different polymeric chains of the blend components;

(3) such sulfonic acid blends which have been prepared with water-soluble sulfonate salts/sulfonic acids show surprisingly high ion-exchange capacities up to 2.7 meq $SO_3H$/g Polymer (sulfonated ionomers of this capacity are usually water-soluble), which leads to extremely low electric resistances (example 11), $R_{a,H}+$=0,05 Ohm $cm^2$, $R_{sp, H}+$=5,88 Ohm cm.

(4) surprisingly, the acid-base-blends show a very low methanol-permeability which is a factor 60–250 lower than the methanol-permeability of NAFION®, which might be advantageous for their application in DMFC;

(5) surprisingly, the acid-base blends show an excellent performance in $H_2$-PEFC and DMFC.

(6) surprisingly, no precipitation of polyelectrolyte complex occurs when mixing solutions of weakly basic polymeric bases like poly(ethersulfone-ortho-sulfonediamine) in N-methyl pyrrolidinone (NMP), N,N-dimethylacetamide (DMAc), N,N-dimethylformamide (DMF), or Dimethyl sulfoxide (DMSO) with solutions of polymeric sulfonic acids like poly(ethersulfone sulfonic acid) or poly(etheretherketone sulfonic acid) in N-methyl pyrrolidinone (NMP), N,N-dimethylacetamide (DMAc), N,N-dimethylformamide (DMF), or Dimethyl sulfoxide (DMSO). However, when mixing solutions of stronger polymeric bases like poly(4-vinylpyridine) with solutions of polymeric sulfonic acids, precipitation of polyelectrolyte complex occurs:

PPy+P'—$SO_3H$ ----> [PPyH$^+$ $^-O_3$S—P']$_{precipitate}$ (7) surprisingly, it was established that when mixing a polymeric sulfonic acid salt (example: poly(etheretherketone Li-sulfonate) or poly(ethersulfone Li-sulfonate)) or the solution of this salt with solutions of a polymeric base like poly(ethersulfone-ortho-sulfonediamine), poly(4-vinylpyridine), poly(ethylenimine), poly(aniline), in analogy to know blends, clear, transparent solutions are formed, which form clear, transparent and mechanically and thermally stable polymeric films after evaporation of solvent. When these films are posttreated with diluted mineralic acids (like 4–10% HCl or 4–10% $H_2SO_4$) at temperatures from 20–100° C., via this route such acid-base blends are obtained which are not directly available from the mixing of the (solution of the) polymeric sulfonic acid with (a solution of) the polymeric base because of the precipitation of polyelectrolyte complex. Via this process, for example, clear, transparent blend films of poly(4-vinylpyridine) with poly(ethersulfone sulfonic acid) or poly(etheretherketone sulfonic acid) can be obtained, which are not directly available from poly(4-vinylpyridine) and poly(ethersulfone sulfonic acid)/poly(etheretherketone sulfonic acid) due to polyelectrolyte complex formation.

By the aforementioned route, clear, transparent acid-base blends/blend membranes of nearly every polymeric sulfonic acid/polymeric sulfonic acid salt with practically every polymeric base are available. By the respective selection of the reaction partners, the properties of the resulting acid-base-blend can be tailormade (fine-tuned).

The advantageous properties of the acid-base blends may be generated in analogy to known blends by specific interactions between the polymeric chains of the blend components (see Bazuin, C. G.) (Zhang, X.; Eisenberg, A.: NMR and Dynamic Mechanical Studies of Miscibility Enhancement via Ionic Interactions in Polystyrene/poly(ethyl Acrylate) Blends, J. Polym. Sci.: Part B: Polymer Physics, 28, 1841–1857 (1990)):

hydrogen bridges acid-base interactions (polysalt formation)

ion-dipole-interactions

These specific interactions could lead to clear, transparent films and even to molecular miscibility of the blend components when the interaction forces are strong enough.

The acid-base polymer blends/blend membranes can be advantageously applied to DMFC or $H_2$-PEFC and to other membrane processes like:

membrane electrolysis aqueous or non-aqueous electrodialysis (polymer electrolyte (PEM) electrolysis)

diffusion dialysis separation of alkenes from alkene/alkane mixtures (here the membranes are in the $SO_3Ag$ form, where the $Ag^+$ ion reversibly complexes the alkene and thus selectively transports it through the membrane (–> facilitated transport) (van Zyl, A. J.; Linkov, V. M.; Bobrova, L. P.; Timofeev, S. V: Perfluorosulfonate Ionomer Membranes for Separation of Petrochemical Mixtures, J. Mat. Sci. Lett., 15, 1459 (1996)) via gas separation, pervaporation or perstraction.

Pervaporative separation of water from water/organics mixtures

Vapor separation of water vapor from its mixtures with permanent gases or with organics.

The acid-base blend polymer membranes according to this invention may also be used in microfiltration techniques (e.g., nanofiltration, ultrafiltration) and reverse osmosis. They are useful in the form of flat membranes or hollow fibers in the above processes.

EXAMPLES

Examples 1–7

Synthesis of an acid-base blend from sulfonated PEEK and aminated PSU

Poly(etheretherketone sulfonic acid) Victrex® was prepared according to Helmer-Metzmann et al. The polymer shows an ion-exchange capacity of 1,66 meq $SO_3H$/g. Diaminated PSU was prepared according to Guiver et al. The polymers were mixed in different relations (Tab. 1), and the polymer mixture was dissolved in N-methyl pyrrolidinone to end up in a 15 wt % solution. The solution was filtered and degassed. Subsequently, the solution was poured onto a support (glass plate, non-woven or textile), and a film of constant thickness was formed by means of a doctor-knife. Then, the solvent was evaporated at 125° C. in an oven under air-circulation or at reduced pressure. After the evaporation of the solvent, the glass plate with the pendent polymer film was put into deionized water. After ca. ½ h the membrane was peeled off the glass plate. The membrane was posttreated for 48 h first in 1N HCl, and subsequently in deionized water at temperatures from 60–80° C. Subsequently, their properties have been characterized. The characterization results are gathered in Tab. 1.

TABLE 1

Composition and properties of blend membranes from sulfonated PEEK and diaminated PSU

| Example | Composition | Swelling % | IEC meg/g | Perm-select-ivity % | $R_a$ Ohm. $cm^2$ | $R_{sp}$ Ohm. $cm^2$ |
|---|---|---|---|---|---|---|
| 1 | 4.25 g PEEK $(SO_3H)_{0.5}$ 0.75 g PSU $(NH_2)_2$ | <40 | 1.34 | | 0.109 | 18.2 |
| 2 | 4.5 g PEEK $(SO_3H)_{0.5}$ 0.5 g PSU $(NH_2)_2$ | <50 | 1.58 | | 0.101 | 34.8 |
| 3 | 4 g PEEK $(SO_3H)_{0.5}$ 1 g PSU $(NH_2)_2$ | 23.81 | 1.4 | 94.44 | 0.25 | 46.41 |
| 4 | 4.25 g PEEK $(SO_3H)_{0.5}$ 0.75 g PSU $(NH_2)_2$ | 29.5 | 1.63 | 97.1 | | 24.8 |
| 5 | 4 g PEEK $(SO_3H)_{0.5}$ 1 g PSU $(NH_2)_2$ | 28.4 | 1.54 | 95 | | 23.6 |
| 6 | 3.5 g PEEK $(SO_3H)_{0.5}$ 1.5 g PSU $(NH_2)_2$ | 21.4 | 1.42 | 98.2 | | 50.3 |
| 7 | 2.4 g PEEK $(SO_3H)_{0.5}$ 1.6 g PSU $(NH_2)_2$ | 16.7 | 1.13 | 99.5 | | 105.5 |

Examples 8 to 18
Synthesis of an acid-base blend from sulfonated PSU and aminated PSU Poly(ethersulfone sulfonic acid) Udel® was prepared according to Kerres et al. The polymer has either an ion-exchange capacity of 2,6 meq $SO_3H/g$ (water-soluble), or an ion-exchange capacity of 1,7 meq $SO_3H/g$ (water-insoluble). Diaminated PSU was prepared according to Guiver et al. The polymers were mixed in different relations (Tab. 1), and the polymer mixture was dissolved in N-methyl pyrrolidinone to end up in a 15 wt % solution. The solution was filtered and degassed. Subsequently, the solution was poured onto a support (glass plate, non-woven or textile), and a film of constant thickness was formed by means of a doctor-knife. Then, the solvent was evaporated at 125° C. in an oven under air-circulation or at reduced pressure. After the evaporation of the solvent, the glass plate with the pendent polymer film was put into deionized water. After ca. ½ h the membrane was peeled off the glass plate. The membrane was posftreated for 48 h first in 1N HCl, and subsequently in deionized water at temperatures from 60–80° C. Subsequently, their properties have been characterized. The characterization results are gathered in Tab. 2.

TABLE 2

Composition and properties of acid-base blend membranes from sulfonated and aminated PSU

| Example | Composition | Swelling % | IEC meg/g | Perm-select-ivity % | $R_a$ Ohm. $cm^2$ | $R_{sp}$ Ohm. $cm^2$ |
|---|---|---|---|---|---|---|
| 8 | 3 g $PSUSO_3H$ 1 g $PSU(NH_2)_2$ | 26.83 | 1.44 | 97.25 | 0.261 | 70.41 |
| 9* | 2.8 g $PSUSO_3Li$ 0.7 g $PSU(NH_2)_2$ | 20.22 | 1.27 | 99.18 | 0.68 | 65.34 |
| 10 | 4.2 g $PSUSO_3H$ 1.8 g $PSU(NH_2)_2$ | 17.04 | 1.09 | 99.74 | 0.966 | 148.61 |
| 11 | 5.4 g $PSUSO_3H$ 0.6 g $PSU(NH_2)_2$ | 40.54 | 1.59 | 92.14 | 0.139 | 13.93 |
| 12 | 4.8 g $PSUSO_3H$ 1.2 g $PSU(NH_2)_2$ | 30.6 | 1.54 | 97.05 | 0.28 | 29.09 |
| 13 | 3 g $PSUSO_3H$ 3 g $PSU(NH_2)_2$ | 11.70 | 0.42 | 99.58 | — | — |
| 14 | 3.6 g $PSUSO_3H$ 2.4 g $PSU(NH_2)_2$ | 13.86 | 0.97 | 99.24 | 3.21 | 401.1 |
| 15 | 4.2 g PSU $(SO_3H)_{1,6}$ 1.8 g PSU $(NH_2)_2$ | 42.07 | 2.1 | — | 0.094 | 14.46 |
| 16 | 4.8 g PSU $(SO_3H)_{1,6}$ 1.2 g PSU $(NH_2)_2$ | 63.27 | 2.31 | — | 0.057 | 7.92 |
| 17 | 5.28 g PSU $(SO_3H)_{1,6}$ 0.72 g PSU $(NH_2)_2$ | 120.77 | 2.57 | — | 0.0475 | 5.52 |
| 18 | 5.58 g PSU $(SO_3H)_{1,6}$ 0.42 g PSU $(NH_2)_2$ | 306.25 | 2.66 | — | 0.05 | 5.88 |

*Membrane was prepared via mixing PSU-Li-sulfonate and aminated PSU

EXAMPLE 19

Preparation of an acid-base blend membrane from sulfonated PSU and poly(4-vinylpyridine)

5.7 g sulfonated PSU in the $SO_3Li$ form (IEC=1,6 meq/g) were dissolved in 24 g N-methylpyrrolidinone. Subsequently, 0.3 g poly(4-vinylpyridine) (MW=200,000 g/mole) were dissolved in this solution. The solution was filtered and degassed. Subsequently, the solution was poured onto a support (glass plate, non-woven or textile), and a film of constant thickness was formed by means of a doctor-knife. Then, the solvent was evaporated at 125° C. in an oven under air-circulation or at reduced pressure. After the evaporation of the solvent, the glass plate with the pendent polymer film was put into deionized water. After ca. ½ h the membrane was peeled off the glass plate. The membrane was posttreated for 48 h first in 1N HCl, and subsequently in deionized water at temperatures from 60–80° C. Subsequently, their properties have been characterized.

Characterization results:

Capacity: IEC=1.2 meq $SO_3H/g$ Polymer

Thickness: d=65 μm

Swelling ($H_2O$, RT, $H^+$ form): SW=3.22%

Area resistance (RT, $H^+$ form)

(measured in 0.5 N HCl): 0.144 Ohm $cm^2$

Specific resistance (RT, $H^+$ –form): 22.1 Ohm cm

EXAMPLE 20

Preparation of an acid-base blend from sulfonated PSU and polyethylene imine 3 g water-soluble PSU Udel® in the $SO_3Li$ form (Capacity 2.5 meq $SO_3H/g$ Polymer) were dissolved in 17 g N,N-dimethylacetamide (DMAc). Subsequently, into the solution were dropped 0.322 g 50 wt % polyethylene imine solution (ALDRICH; prod. No. 18, 197–8). The solution was filtered and degassed. Subsequently, the solution was poured onto a support (glass plate, non-woven or textile), and a film of constant thickness was formed by means of a doctor-knife. Then, the solvent was evaporated at 125° C. in an oven under air-circulation or at reduced pressure. After the evaporation of the solvent, the glass plate with the pendent polymer film was put into deionized water. After ca. ½ h the membrane was peeled off the glass plate. The membrane was posttreated for 48 h first in 1N HCl, and subsequently in deionized water at temperatures from 60–80° C. Subsequently, their properties have been characterized.

Characterization results:

Capacity: IEC=1.65 meq $SO_3H$/g Polymer

Thickness: d=110 $\mu$m

Swelling ($H_2O$, RT, $H^+$ form): SW=160%

Area resistance (RT, $H^+$ form)

(measured in 0.5 N HCl): 0.0623 Ohm*$cm^2$

Specific resistance (RT, $H^+$ –Form): 5.67 Ohm*cm

EXAMPLE 21

Application of an acid-base blend membrane in a $H_2$-PEFC

Two of the membranes (example 2, upper curve, and example 1, lower curve in FIG. 1), have been tested in a $H_2$-PEFC in oxygen- and in air-mode. The membranes were coated with SIEMENS electrodes having a Pt-content of 4 mg Pt/g. The experimental conditions in $O_2$/$H_2$-mode were:

Pressure: 2 bar absolute

Lambda: 2

Temperature: 80° C.

The U/i-curve obtained in $O_2$/$H_2$-mode is shown in FIG. 1

The experimental conditions in air/$H_2$-mode were:

Pressure: 1.5 bar absolute

Lambda: 10

Temperature: 65° C.

Figure 2:
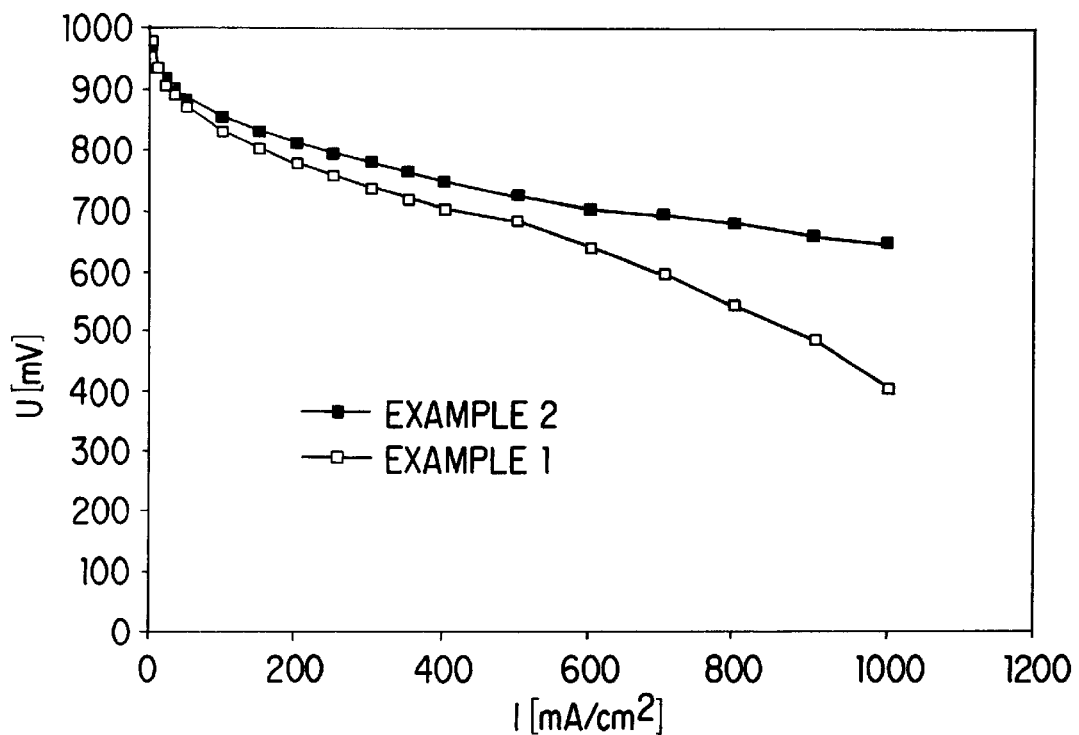

The U/i-curve obtained in air/$H_2$-mode is shown in FIG. 2.

From the FIGS. 1 and 2 it can be seen that the performance of the membranes investigated in PEFC is excellent in $O_2$ as well as in air mode.

EXAMPLE 22

Application of an acid-base blend membrane in DMFC

Figure 3:
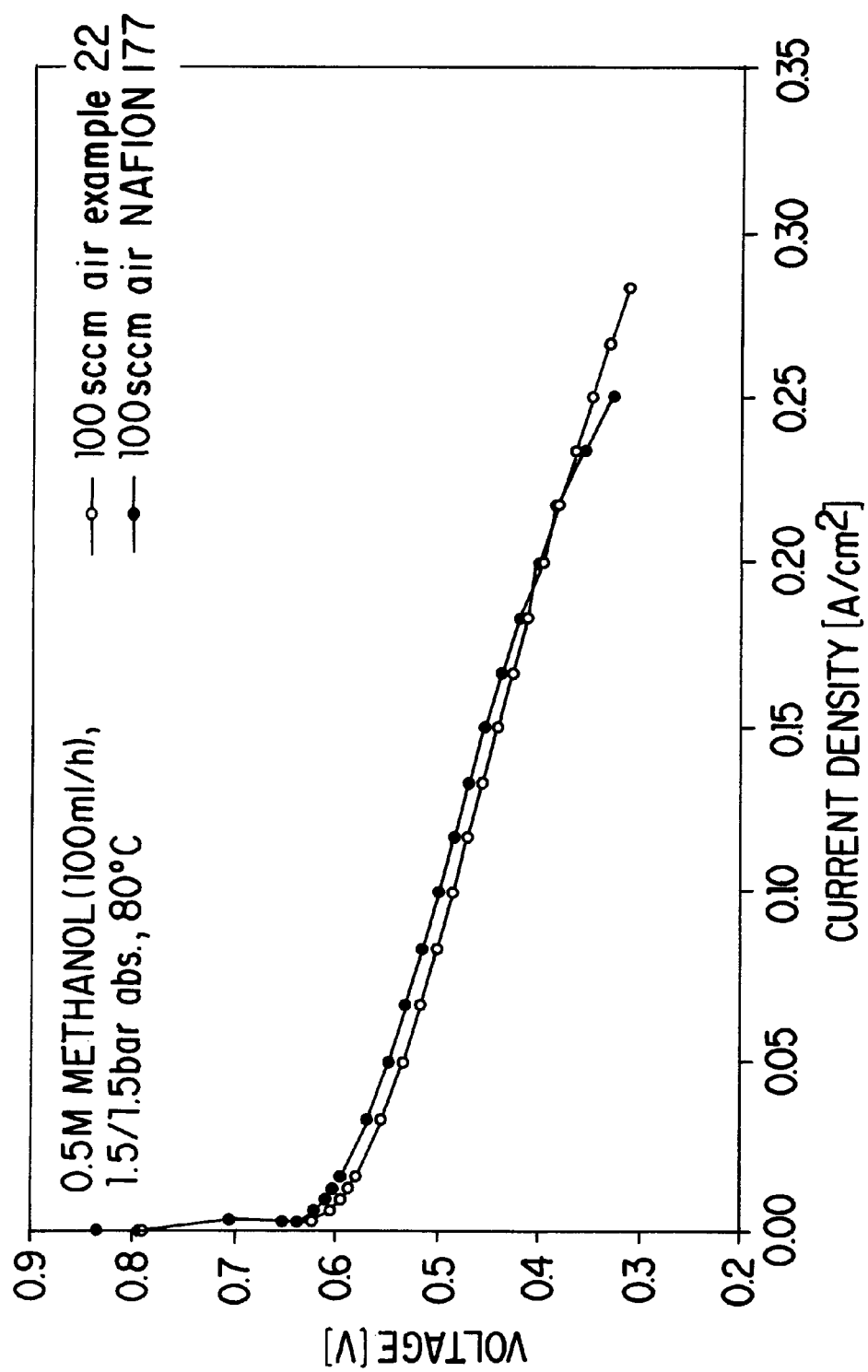

One of the membranes (example 1) was tested in a DMFC in $O_2$/$H_2$ and air/$H_2$ mode. The membrane has been coated with SIEMENS electrodes. In FIG. 3, the U/i-curve of the performance test in DMFC in air/$H_2$ mode is shown. The concentration of methanol was 0.5 N in water.

The experimental conditions have been:

Pressure: 1.5/1.5 bar absolute

Flow: 100 ml/min air

Temperature: 80° C.

Surprisingly, the performance of the membrane shown in FIG. 3 is nearly as good as the performance of NAFION® 117. Via further thickness-reduction and/or reduction of methanol-permeability via incorporation of a higher amount of diaminated PSU, even better performance of the membranes in DMFC than obtained with NAFION® is possible.

We claim:

1. A process for the preparation of ion-exchange membranes, the process comprising:

(a) preparing a solution of a polymeric sulfonic acid or a polymenc sulfonate salt of formula (I) in a dipolar-aprotic solvent

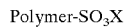 (I)

where X=H or a monovalent cation;

(b) dissolving a basic polymer containing primary, secondary or tertiary basic N groups in solution (a), wherein said basic polymer is selected from the group consisting of poly(etheretherketone)s and poly(ethersulfone)s;

(c) spreading a thin layer of the polymeric solution (b) onto a support;

(d) evaporating the solvent to form a polymeric film;

(e) removing the formed polymeric film from the support;

(f) post-treating the film in diluted mineral acid at temperatures from ambient temperature to 100° C.; and (g) post-treating the film in deionized water at temperatures of from ambient temperature to 100° C. until all excess acid is washed out from the polymeric film.

2. A process for the preparation of ion exchange membranes, the proess comprising:

(a) preparing a solution of a polymeric sulfonic acid or a polymeric sulfonate salt of formula (I) in a dipolar-aprotic solvent

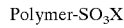 (I)

where X=H or a monovalent cation;

(b) preparing a solution of a basic polymer containing primary, secondary or tertiary basic N groups in a dipolar-aprotic solvent, wherein said basic polymer is selected from the group consisting of poly(etheretherketone)s and poly(ethersulfone)s;

(c) mixing solutions (a) and (b);

(d) spreading a thin layer of polymeric solution (c) onto a support;

(e) evaporating the solvent to form a polymeric film;

(f) removing the formed polymeric film from the support;

(g) post-treating the film in diluted mineral acid at temperatures from ambient temperature to 100° C.; and (h) post-treating the film in deionized water at temperatures of from ambient temperature to 100 ° C. until all excess acid is washed out from the polymeric film.

3. The process according to any of claims 1 or 2, wherein the monovalent cation is selected from the group consisting of $Li^+$, $Na^+$, $K^+$, $Rb^+$, $Cs^+$, $Ag^+$, $NH_4^+$, $NH_3R^+$, $NH_2R_2^+$, $NHR_3^+$, $NR_4^+$, and $PyridinH^+$, R being an alkyl or aryl radical.

4. Process according to any of claims 1 or 2 wherein said sulfonated polymers comprise repeating units of the formulas $R_1$ or $R_2$, where $R_1$ is

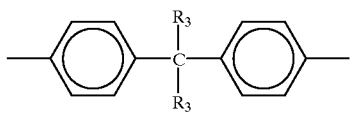

$R_2$ is

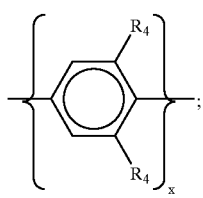

$R_3$, $R_4$ are H, $CF_3$, or $C_nH_{2n+1}$, n=1 to 10, or phenyl, said repeating units being connected via bridge groups $R_5$, $R_6$, $R_7$, or $R_8$, where
$R_5$ is —O—;
$R_6$ is —$SO_2$—;
$R_7$ is —C=O—; and
$R_8$ is —S—.

5. The process for the preparation of ion-exchange membranes according to claim 4, wherein said sulfonated polymer is Poly(etheretherketone) with ($[R_5—R_2—R_5—R_2—R_7—R_2]_n$, $R_4$=H),
Poly(ethersulfone) ($[R_1—R_5—R_2—R_6—R_2—R_5]_n$; $R_4$=H),
Poly(ethersulfone) ($[R_2—R_6—R_2—R_5]_n$ $R_4$=H),
Poly(phenylsulfone) ($[(R_2)_2—R_5—R_2—R_6—R_2]_n$; $R_4$=H),
Poly(etherethersulfone) ($[R_5—R_2—R_5—R_2—R_6]_n$—$[R_5—R_2—R_6—R_2]_m$; $R_4$=H),
Poly(phenylenesulfide) ($[R_2—R_8]_n$; $R_4$=H),
Poly(phenyleneoxide) ($[R_2—R_5]_n$; $R_4$=$CH_3$), or
Polyphenylene ($[R_2]_n$; $R_4$=any organic rest),
wherein n and m correspond to the degree of polymerization.

6. A process for the preparation of ion-exchange membranes, the process comprising:
(a) preparing a solution of a polymeric sulfonic acid in a dipolar-aprotic solvent;
(b) neutralizing $SO_3H$ groups of the polymeric sulfonic acid via addition of an equimolar quantity of a low-molecular primary, secondary, or tertiary amine;
(c) dissolving a basic polymer containing primary, secondary or tertiary basic N groups in solution (b), wherein said basic polymer is selected from the group consisting of poly(etheretherketone)s and poly(ethersulfone)s;
(d) spreading a thin layer of polymeric solution (c) onto a support;
(e) evaporating the solvent to form a polymeric film;
(f) removing the formed polymeric film from the support;
(g) post-treating the film in diluted mlineralic acid at temperatures from ambient temperature to 100 ° C.; and
(h) post-treating the film in deionized water at temperatures of from ambient temperature to 100° C. until all excess acid is washed out from the polymeric film.

7. The process according to any of the claims 1, 2 or 6, wherein said dipolar-aprotic solvents are selected from the group consisting of N-methylpyrrolidinone, N,N-dimethylacetamide, N,N-dimethylformamide, sulfolane, and dimethyl sulfoxide.

8. The process according to the claims 1, 2, or 6, wherein the sulfonated polymers are selected from the group consisting of poly(etheretherketone)s and poly(ethersulfone)s.

* * * * *